US012663894B2

(12) United States Patent
Kinemura et al.

(10) Patent No.: US 12,663,894 B2
(45) Date of Patent: Jun. 23, 2026

(54) DRIVE CIRCUIT, TACTILE SENSATION GENERATOR, AND METHOD FOR CONTROLLING DRIVE CIRCUIT

(71) Applicant: Alps Alpine Co., Ltd., Tokyo (JP)

(72) Inventors: Kazuhiko Kinemura, Miyagi-ken (JP); Takashi Sato, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 215 days.

(21) Appl. No.: 18/439,852

(22) Filed: Feb. 13, 2024

(65) Prior Publication Data

US 2024/0329767 A1     Oct. 3, 2024

(30) Foreign Application Priority Data

Mar. 31, 2023     (JP) ................................. 2023-057613

(51) Int. Cl.
　　*G06F 3/041*　　　(2006.01)
　　*G06F 3/01*　　　(2006.01)
(52) U.S. Cl.
　　CPC .......... *G06F 3/04164* (2019.05); *G06F 3/016* (2013.01)
(58) Field of Classification Search
　　None
　　See application file for complete search history.

(56) References Cited

U.S. PATENT DOCUMENTS

| | | | | |
|---|---|---|---|---|
| 5,126,589 | A * | 6/1992 | Renger ................... | B06B 1/023 |
| | | | | 327/365 |
| 8,314,531 | B2 * | 11/2012 | Sunaga ................ | H10N 30/802 |
| | | | | 310/317 |
| 9,552,008 | B1 * | 1/2017 | Shimamune .............. | G05F 3/08 |

FOREIGN PATENT DOCUMENTS

JP　　　　H10-308635 A　　　11/1998

* cited by examiner

*Primary Examiner* — Krishna P Neupane
(74) *Attorney, Agent, or Firm* — Harness, Dickey & Pierce, P.L.C.

(57) ABSTRACT

A drive circuit includes a first switching element inserted in a current path connecting a load with a resonance frequency to a reference potential point, a drive element having a first input terminal to which a load signal obtained by converting a current flowing in the current path into a voltage is input, a second input terminal to which a first control signal that serves as a reference for operation of the first switching element is input, and an output terminal connected to a control terminal of the first switching element, and a second switching element inserted in a first connection path connecting the output terminal of the drive element and the first input terminal of the drive element.

18 Claims, 2 Drawing Sheets

DRIVE CIRCUIT, TACTILE SENSATION GENERATOR, AND METHOD FOR CONTROLLING DRIVE CIRCUIT

CLAIM OF PRIORITY

This application claims benefit of Japanese Patent Application No. 2023-057613 filed on Mar. 31, 2023, which is hereby incorporated by reference.

BACKGROUND

1. Field of the Invention

The present disclosure relates to a drive circuit, a tactile sensation generator, and a method for controlling the drive circuit.

2. Description of the Related Art

In general, current output circuits that have a field effect transistor (FET) on a low side of a load to drive the load, and that drive the FET by an output of an operational amplifier have been used. An inverting input terminal of the operational amplifier is connected to a current output terminal of the FET (refer to, for example, Japanese Unexamined Patent Application Publication No. 10-308635).

Here, an operational amplifier generates an offset voltage between the inverting input terminal and a non-inverting input terminal, and therefore, even when 0 V is input to the non-inverting input terminal of the operational amplifier during a period when the FET is in an off state, a voltage at an output terminal is not 0 V. Furthermore, a gain of the operational amplifier is very high. Therefore, during the period when the FET is in the off state, a minute voltage is amplified with a very large gain and output from the output terminal, and accordingly, the FET may not be turned off and the load may not be efficiently driven.

SUMMARY

The present disclosure provides a drive circuit capable of efficiently driving a load, a tactile sensation generator, and a method for controlling the drive circuit.

According to an aspect of the present disclosure, a drive circuit includes a first switching element inserted in a current path connecting a load with a resonance frequency to a reference potential point, a drive element having a first input terminal to which a load signal obtained by converting a current flowing in the current path into a voltage is input, a second input terminal to which a first control signal that serves as a reference for operation of the first switching element is input, and an output terminal connected to a control terminal of the first switching element, and a second switching element inserted in a first connection path connecting the output terminal of the drive element and the first input terminal of the drive element.

A drive circuit capable of efficiently driving a load, a tactile sensation generator, and a method for controlling the drive circuit may be provided.

DETAILED DESCRIPTION

The following describes an embodiment to which a drive circuit, a tactile sensation generator, and a method for controlling the drive circuit according to the present disclosure are applied. In the following, a description will be made while an XYZ coordinate system is defined. Furthermore, for convenience of explanation, a −Z direction is referred to as a lower side or a bottom and a +Z direction as an upper side or a top, but this does not represent a universal vertical relationship. Moreover, an XY-plane view is referred to as a plan view.

Embodiment

Figure 1:
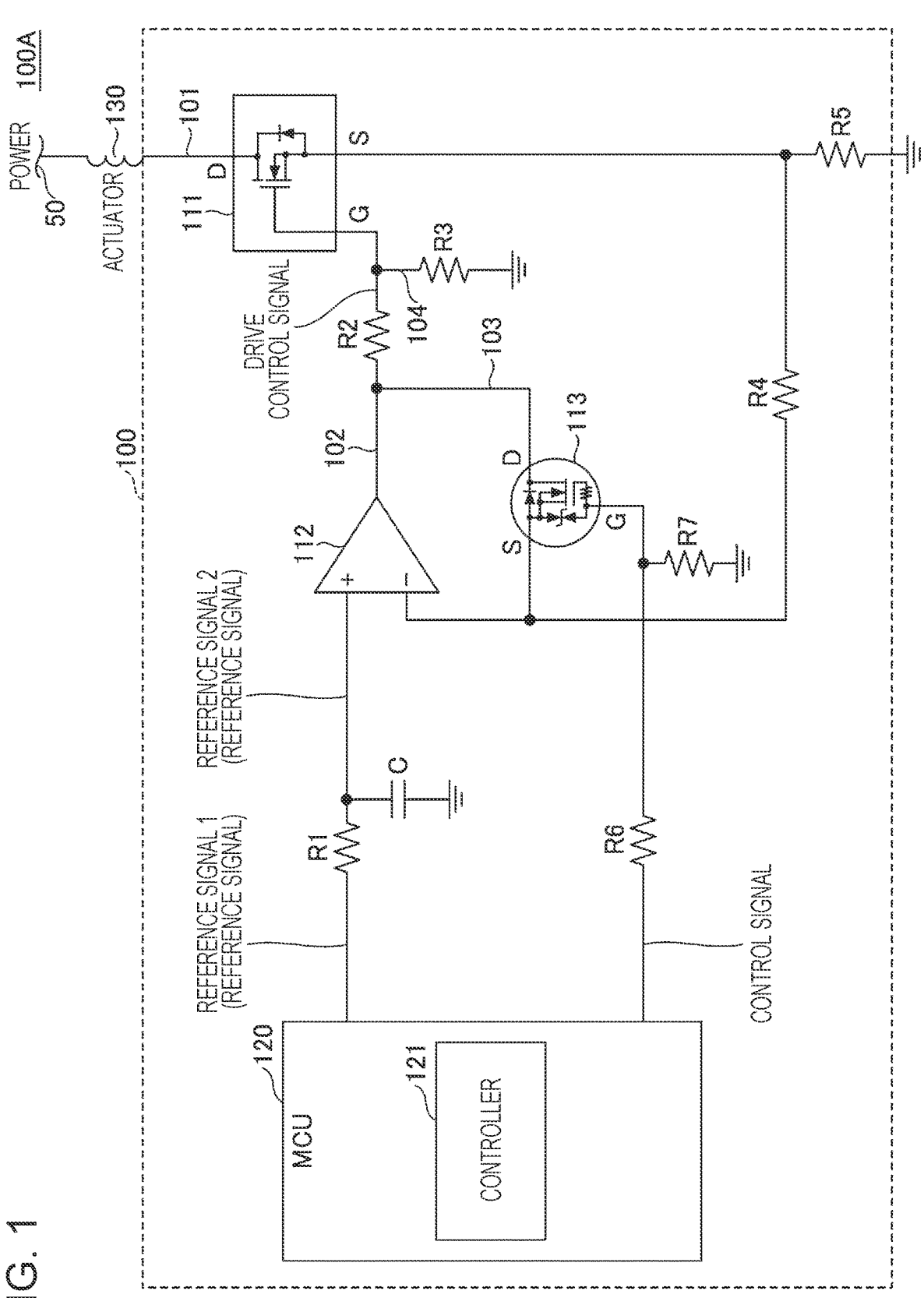
FIG. 1 is a diagram illustrating a configuration of a tactile sensation generator including a drive circuit according to an embodiment.

FIG. 1 is a diagram illustrating a configuration of a tactile sensation generator 100A including a drive circuit 100 according to an embodiment. The drive circuit 100 drives an actuator 130, and the tactile sensation generator 100A includes the drive circuit 100 and the actuator 130. The actuator 130 is an example of a load.

The actuator 130, as an example, is disposed in an operation unit of an input device that accepts operations performed by a user's fingertip or the like. When an operation is performed by a user's fingertip or the like on the operation unit of the input device, the actuator 130 is driven to vibrate the tactile sensation generator 100A so that a tactile sensation for the user's fingertip or the like is generated. The input device may be included in, for example, a remote controller terminal or a smartphone that remotely controls an operable device that performs a function in accordance with content of the operation, or may be integrated into an operation unit of the operable device.

As an example, a form in which the tactile sensation generator 100A is integrally configured as a single device will now be described. However, for example, an MCU 120 may be disposed separately from the other components of the tactile sensation generator 100A. For example, an MCU which is a device different from the tactile sensation generator 100A may also has a function of the MCU 120. Furthermore, the actuator 130 may be separately installed in a distant location from the other components of the tactile sensation generator 100A.

Although a form in which the tactile sensation generator 100A includes the actuator 130 is described herein, the load included in the tactile sensation generator 100A may be a load other than the actuator 130 (e.g., a light emitting diode (LED), a heater, or the like). Although the form in which the user operates the input device with a user's fingertip is described herein, the user may operate the device with any part of the user's body other than the fingertip.

Configuration of Drive Circuit 100

The drive circuit 100 includes a field effect transistor (FET) 111, an operational amplifier 112, an FET 113, resistors R1 to R7, and the micro controller unit (MCU) 120. The MCU 120 has a controller 121.

The FET 111 is an example of a first switching element. The operational amplifier 112 is an example of a drive element. The FET 113 is an example of a second switching element. The resistor R2 is an example of a first resistor. The resistor R3 is an example of a second resistor.

A power supply terminal 50 is also illustrated in FIG. 1. A voltage applied to the power supply terminal 50 is higher than a rated voltage for operating the operational amplifier 112 and the controller 121.

Actuator 130

The actuator 130 is a linear resonance actuator (LRA) as an example. The actuator 130 is an example of an inductive load with a resonance frequency. The actuator 130 is inserted in series in a current path 101 connecting the power supply terminal 50, which outputs DC power, to a ground potential point. The ground potential point is an example of a reference potential point. The current path 101 is realized by wiring of a circuit board or the like on which the drive circuit 100 is mounted, as an example. Note that the form in which the actuator 130 is an LRA is described here, for example. However, since the actuator 130 is at least an inductive load with a resonance frequency, a voice coil motor may be used as the actuator 130 instead of an LRA.

The FET 111 has a drain terminal (D), a source terminal (S), and a gate terminal (G). The gate terminal is an example of a control terminal of the FET 111. The drain terminal is connected to the actuator 130. The source terminal is connected to an inverting input terminal (–) of the operational amplifier 112 via the resistor R4 and also to a ground potential point via the resistor R5. The current path 101 extending from the power supply terminal 50 through the actuator 130, the FET 111, and the resistor R5 to the ground potential point supplies current to the actuator 130. The FET 111 forms a constant-current circuit with the operational amplifier 112.

The operational amplifier 112 has a non-inverting input terminal (+) to which a reference signal is input from the controller 121, the inverting input terminal (–) connected to the source terminal of the FET 111 via the resistor R4, and an output terminal connected to the gate terminal of the FET 111 via the resistor R2. The inverting input terminal of operational amplifier 112 is an example of a first input terminal, and the non-inverting input terminal is an example of a second input terminal. A reference signal is an example of a first control signal. Reference signals 1 and 2 will be described below.

A path 102 connecting the output terminal of the operational amplifier 112 to the gate terminal of the FET 111 is an example of a second connection path. A path 103 connecting the output terminal of the operational amplifier 112 to the inverting input terminal of the operational amplifier 112 is an example of a first connection path. The FET 113 is inserted in the path 103. A path 104, which connects a branch point that is branched from the path 102 (the example of the second connection path) in a position between the resistor R2 and the gate terminal of the FET 111 to the ground potential point, is an example of a branch path. The paths 102, 103, and 104 are realized by wiring on the circuit board or the like on which the drive circuit 100 is mounted, as an example.

The resistor R1 is inserted in series in a path connecting the MCU 120 and the non-inverting input terminal of the operational amplifier 112. A capacitor C inserted in series in a path extending from one side of the resistor R1 near the non-inverting input terminal to the ground potential point and the resistor R1 constitute an RC filter circuit. Furthermore, a reference signal is input to the RC filter circuit from the MCU 120, and the reference signal that passes through the RC filter circuit is input to the non-inverting input terminal of the operational amplifier 112. A waveform of the reference signal changes before and after passing through the RC filter circuit. For this reason, when distinguishing between reference signals before and after passing through the RC filter circuit, the reference signal before passing through the RC filter circuit is referred to as a reference signal 1, and the reference signal after passing through the RC filter circuit is referred to as a reference signal 2. When the reference signals 1 and 2 are not specifically distinguished, they are simply referred to as reference signals.

The resistor R2 is inserted in series in the path 102 connecting the output terminal of the operational amplifier 112 and the gate terminal of the FET 111. The resistor R2 is disposed to protect the operational amplifier 112 by limiting a current value of an inrush current flowing from the output terminal of the operational amplifier 112 to the path 102.

The resistor R3 is inserted in series in the path 104 (the example of the branch path), which branches off from the path 102. The resistor R4 is inserted in series in a path which branches off from the current path 101 at a point near the power supply terminal 50 relative to the resistor R5 of the current path 101 and which is connected to the inverting input terminal of the operational amplifier 112. The resistor R5 is inserted in series in the current path 101 before the ground potential point of the current path 101. The resistor R6 is inserted in series in a path connecting a gate terminal of the FET 113 to the MCU 120. The resistor R7 is inserted in series in a path which branches off from the path connecting the gate terminal of the FET 113 to the MCU 120 and which is connected to the ground potential point.

A load signal obtained by converting a current flowing into the current path 101 between the actuator 130 and resistor R5 into a voltage by the resistor R5 is input to the inverting input terminal of the operational amplifier 112. The reference signal input from the controller 121 to the non-inverting input terminal of the operational amplifier 112 is a reference signal for the operation of the FET 111. The operational amplifier 112 outputs a drive control signal based on a result of comparison between the load signal input to the inverting input terminal and the reference signal to the gate terminal of the FET 111. Note that a signal level of the drive control signal corresponds to a signal level at the gate terminal of the FET 111, which is a signal level at a portion near the gate terminal relative to the resistor R2 in the path 102.

The FET 113 has a drain terminal (D) connected to the output terminal of the operational amplifier 112, a source terminal(S) connected to the inverting input terminal of the operational amplifier 112, and the gate terminal (G) connected to the MCU 120 via the resistor R6. The drain and source terminals of the FET 113 are connected to the path 103. The FET 113 is a small-signal FET and is much smaller in size than the FET 111 for current control.

The FET 113 is switched on and off by a control signal input to the gate terminal from the MCU 120. The control signal is an example of a second control signal. When the FET 113 is turned on, a portion between the output terminal and the inverting input terminal of the operational amplifier 112 is short-circuited by the FET 113, since a portion between the drain and source terminals of the FET 113 becomes conductive. In this state, in a negative feedback loop of the operational amplifier 112 realized by the path 103, a voltage level at the output terminal is equal to a voltage level at the inverting input terminal, so a gain of the operational amplifier 112 is 1.

When the FET 113 is turned off, a resistance of the negative feedback loop of the operational amplifier 112 realized by the path 103 becomes considerably large (to infinity) due to a non-conductive state between the drain and source terminals of the FET 113. Therefore, when the FET 113 is in the off state, the gain of operational amplifier 112 is considerably large. The drive circuit 100 controls a waveform of the drive control signal output from the output terminal of the operational amplifier 112 by switching the FET 113 on and off so as to efficiently drive the actuator 130.

The MCU 120 is implemented by a computer that includes a central processing unit (CPU), a random access memory (RAM), a read only memory (ROM), an I/O interface, and an internal bus. The MCU 120 includes the controller 121. The controller 121 is represented as a functional block of a function of a program to be executed by the MCU 120.

The MCU 120 is connected to the non-inverting input terminal of the operational amplifier 112 and the gate terminal of the FET 113, and outputs a reference signal to the non-inverting input terminal and a control signal to the gate terminal of the FET 113. Details of operations of the reference signal and the control signal will be described below with reference to FIG. 2.

Operation of Drive Circuit 100

Figure 2:
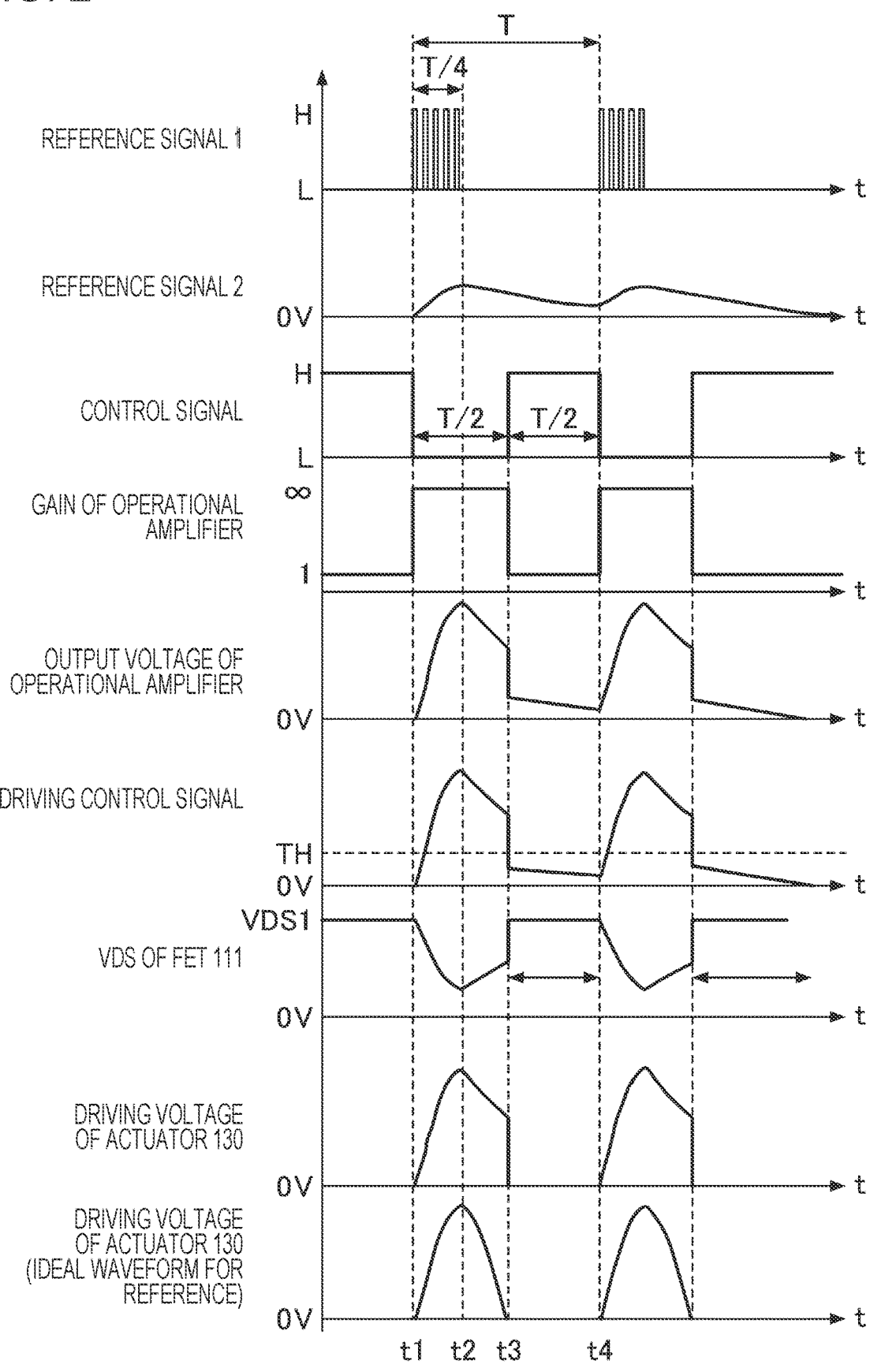
FIG. 2 is a timing chart illustrating an example of operation of the drive circuit according to the embodiment.

FIG. 2 is a timing chart illustrating an example of operation of the drive circuit 100. In FIG. 2, an axis of abscisse represents time t. FIG. 2 shows, in order from top to bottom, the reference signal 1, the reference signal 2, the control signal, the gain of operational amplifier 112, the output voltage of the operational amplifier 112, the drive control signal, a voltage VDS between the drain and the source of the FET 111, a drive voltage of the actuator 130, and a drive voltage (ideal waveform for reference) of the actuator 130. Here, a cycle of a resonance frequency of the actuator 130 is denoted by T. Furthermore, as described above, the drive control signal is a gate voltage of the FET 111 since the drive control signal represents a voltage near the gate terminal of the FET 111 relative to the resistor R2 in the path 102.

Moreover, operation of the drive circuit 100 illustrated in FIG. 2 is realized by the controller 121 executing a process according to a method for controlling the drive circuit of the embodiment.

A drive voltage of the actuator 130 (ideal waveform for reference) indicates a waveform of an ideal drive voltage when the actuator 130 is driven. The ideal waveform has the cycle of T, and a voltage value sinusoidally varies in a first half of the cycle T, and the voltage value is zero in a second half of the cycle T (half-wave rectification waveform). When the cycle T is repeated using such a waveform, the actuator 130 composed of the LRA can be smoothly accelerated in the first half of the cycle T. This is because the sinusoidal waveform causes a transducer of the actuator 130 to be smoothly accelerated.

Furthermore, when the cycle T is repeated using such a waveform, the actuator 130 may be efficiently driven without applying a braking force to vibration of the actuator 130 by not applying a voltage in the second half of the cycle T. This is because applying the voltage in the second half of the cycle T would apply a braking force to vibration of the actuator 130, reducing the acceleration of the transducer that increased in the first half. For this reason, a waveform that has a sinusoidal waveform in the first half in which a voltage is applied to the actuator 130 and zero voltage in the second half is ideal. The drive circuit 100 simulates such an ideal waveform. The drive voltage supplied by the drive circuit 100 to the actuator 130 will be described below.

The reference signals 1 and 2 illustrated in FIG. 2 have a cycle equal to the cycle T of the resonance frequency of the actuator 130. In other words, the controller 121 outputs the reference signal 1 having the cycle T corresponding to the resonance frequency of the actuator 130. The controller 121 also matches the reference signal 1 with the beginning of a cycle of the control signal.

Furthermore, in control of the operation of the drive circuit 100 by the controller 121, a period of ¼ of the cycle T (T/4) and a period of ½ of the cycle T (T/2) are used below for the reference signal 1 and the control signal, respectively. Since the controller 121 digitally controls the reference signal 1 and the control signal, depending on the numbers of bits in the reference signal 1 and the control signal or the like, the cycle T may not be divisible by 4, and the period of T/4 may shift by a fractional amount relative to a period obtained by dividing the cycle T by 4. Similarly, the period of T/2 may be shifted by a fractional amount relative to the period obtained by dividing the cycle T by 2. The period of ¼ of the cycle T (T/4) and the period of ½ of the cycle T (T/2) are meant to allow for such shifts.

Time Point t1 to Time Point t2

During a period from a time point t1 which is the beginning of the cycle T of the resonance frequency of the actuator 130 to a time point t2 when the period of T/4 has elapsed, the reference signal 1 has a waveform pattern in which a PWM (pulse width modulation) pulse signal is repeatedly turned on and off. Although five PWM pulse signals are illustrated for simplicity of the drawing in FIG. 2, when a pulse width is gradually increased from the time point t1 to the time point t2, the period of T/4 of a sinusoidal wave that starts rising from the beginning of the cycle T may be reproduced. The increase in the pulse width corresponds to increase in a duty ratio of the PWM pulse signals.

A period from the time point t1 to the time point t2 is the period of T/4 from the beginning of the cycle T (the period of T/4 from ta start of the cycle T).

The reference signal 2 is obtained after the reference signal 1 passes through the RC filter circuit, and therefore, the reference signal 2 has a waveform that smoothly rises from the time point t1 to the time point t2, as illustrated in FIG. 2. By gradually increasing the duty ratio of the PWM pulse signals of the reference signal 1, the reference signal 2, whose voltage value smoothly increases from the time point t1 to the time point t2, may be realized.

The control signal controls ON and OFF of the FET 113 and is set to a low (L) level in the period from the time point t1 to the time point t2. At the L level, the FET 113 is turned off. This is because, in the period of T/4 from the beginning of the cycle T, the reference signal 2 is amplified with a gain of the negative feedback loop of the operational amplifier 112 in order to accelerate the transducer of the actuator 130. Therefore, in the period from the time point t1 to the time point t2, a gain of the operational amplifier 112 is infinite (∞).

In the period from the time point t1 to the time point t2, an output voltage of the operational amplifier 112 has a waveform obtained by amplifying the waveform of the reference signal 2 in the period from the time point t1 to the time point t2. Furthermore, the drive control signal has a waveform obtained by amplifying the waveform of the reference signal 2 in the period from the time point t1 to the time point t2 as well as the output voltage of the operational amplifier 112. The drive control signal begins to rise from the time point t1 and immediately exceeds a threshold TH of a gate voltage at which the FET 111 is turned on.

The drain-source voltage VDS of the FET 111 smoothly decreases from an initial value VDS1 at the time point t1 and continues to smoothly decrease until the time point t2. Furthermore, the drive voltage of the actuator 130 smoothly increases from the time point t1 to the time point t2, as does the waveform of the drive control signal.

Time Point t2 to Time Point t3

A period from the time point t2 to a time point t3 corresponds to a period after the period of T/4 until the period of T/2 of the cycle T.

At the time point t2, the PWM pulse signal of the reference signal 1 is turned off. In other words, the PWM pulse signal is off in the period from the time point t2 to the time point t3.

The reference signal 2 peaks at the time point t2 and declines from the time point t2. This is because the PWM pulse signal is turned off. Therefore, the reference signal 2 smoothly decreases after the time point t2. A time constant of the RC filter circuit determines a rate of attenuation of the waveform.

The control signal is set to a low level in the period from the time point t2 to the time point t3, continuing from the period from the time point t1 to the time point t2. In the period after the period of T/4 until the period of T/2 of the cycle T, the control signal is set to a low level to amplify the reference signal 2 with the gain of the negative feedback loop of the operational amplifier 112, since the transducer of the actuator 130 is accelerated by the reference signal 2 that is decreasing. Therefore, in the period from the time point t2 to the time point t3, the gain of the operational amplifier 112 continues to be infinite (∞), continuing from the period from the time point t1 to the time point t2.

In the period from the time point t2 to the time point t3, the output voltage of the operational amplifier 112 has a waveform obtained by amplifying the waveform of the reference signal 2 in the period from the time point t2 to the time point t3. Furthermore, the drive control signal has a waveform obtained by amplifying the waveform of the reference signal 2 in the period from the time point t2 to the time point t3 as well as the output voltage of the operational amplifier 112. The drive control signal is equal to or greater than the threshold TH in the period from time point t2 to the time point t3.

The drain-source voltage VDS of the FET 111 begins to increase at the time point t2 and smoothly increases until the time point t3. Furthermore, the drive voltage of the actuator 130 smoothly decreases from the time point t2 to the time point t3, as does the waveform of the drive control signal.

Time Point t3 to Time Point t4

A period from the time point t3 to a time point t4 is a remaining period of T/2 from the time point after the period of T/2 from the beginning of the cycle T. That is, the period from the time point t3 to the time point t4 is the period of T/2 in the second half of the cycle T.

In the period from the time point t3 to the time point t4, the PWM pulse signal of the reference signal 1 is held off, continuing from the period from the time point t2 to the time point t3. In other words, the PWM pulse signal is held off in the period from the time point t2 to the time point t4.

The reference signal 2 continues to decrease in the period from the time point t3 to the time point t4. This is because the PWM pulse signal remains off. Therefore, the reference signal 2 smoothly decreases after the time point t3. A time constant of the RC filter circuit determines a rate of attenuation of the waveform.

The control signal is switched to a high (H) level in the period from the time point t3 to the time point t4. In the period of T/2 in the second half of the cycle T, the H level is set to set the gain of the negative feedback loop of the operational amplifier 112 to 1, so that the drive voltage is not applied to the actuator 130. Therefore, in the period from the time point t3 to the time point t4, the gain of the operational amplifier 112 is 1.

In the period from the time point t3 to the time point t4, the output voltage of the operational amplifier 112 has a waveform obtained by copying the waveform of the reference signal 2 in the period from the time point t3 to the time point t4 without amplifying the waveform. Furthermore, the drive control signal has a waveform obtained by copying the waveform of the reference signal 2 in the period from the time point t3 to the time point t4 without amplifying the waveform as well as the output voltage of the operational amplifier 112. The drive control signal is smaller than the threshold TH in the period from the time point t3 to the time point t4. Therefore, the FET 111 is in an off state.

The drain-source voltage VDS of the FET 111 returns to VDS1 at the time point t3 and remains constant at VDS1 until the time point t4. This is because the FET 111 is in the off state in the period from the time point t3 to the time point t4. Furthermore, the drive voltage of the actuator 130 is 0 V in the period from the time point t3 to the time point t4. This is because the FET 111 is in the off state.

As described above, in the period of T/2 in the first half of the cycle T, the drive voltage of the actuator 130 smoothly increases from the beginning of the cycle T (time point t1), peaks at a time point after the period of T/4 from the beginning of the cycle T (time point t2), and then smoothly decreases. During the period of T/2 in the second half of the cycle T (time point t3 to time point t4), the drive voltage of the actuator 130 is 0 V. This results in a waveform that simulates the ideal waveform illustrated at a bottom of FIG. 2.

The controller 121 controls the reference signal to be repeatedly turned on while the control signal is in the off state. Furthermore, the control signal is turned off in the first half of the cycle T of the resonance frequency of the actuator 130 and turned on in the remaining half of the period. The reference signal is repeatedly turned on within the first quarter of the cycle T of the resonance frequency of the actuator 130, and turned off in the remaining three quarters of the period. The reference signal is repeatedly turned on while a duty ratio of the PWM pulse signal is increased within the first quarter in the cycle T.

The controller 121 outputs the reference signal that is repeatedly turned on while increasing the duty ratio of the PWM pulse signal during the first period of T/4 in the cycle T and turns off the PWM pulse signal. By this, the controller 121 causes the operational amplifier 112 to amplify the reference signal 2 to generate a drive voltage of the actuator 130 corresponding to the waveform of the first period of T/4 of the sinusoidal wave.

The controller 121 outputs a reference signal in which the PWM pulse signal is turned off, and also turns off the PWM pulse signal in the period of T/4 (time point t2 to time point t3) from a time point when the period T/4 has passed after the beginning of the cycle T (time point t2). Accordingly, the controller 121 causes the operational amplifier 112 to amplify the reference signal 2 to generate a drive voltage for the actuator 130 corresponding to the waveform in the period of T/4 from the time point when the period of T/4 has elapsed from the beginning of the sinusoidal wave (time point t2).

In the period of T/2 in the second half of the cycle T, the controller 121 outputs a reference signal with the PWM pulse signal turned off and turns on the control signal. As a result, the controller 121 supplies a drive voltage of 0 V to the actuator 130.

The drive voltage of the actuator 130 thus obtained in the cycle T has a waveform that peaks at the time point t2 and smoothly decreases in the first half of the cycle T and is held at 0 V in the second half, as illustrated in FIG. 2. This waveform simulates the ideal waveform shown at the bottom of FIG. 2.

Thus, in the first half of the cycle T, the transducer of the actuator 130 may be smoothly accelerated, and in the second half, the transducer may be smoothly oscillated by inertia without braking force on the acceleration in the first half. Accordingly, the actuator 130 may be efficiently driven. Note that, when stronger oscillation is to be generated, the driving in the cycle T may be repeated over a plurality of cycles.

Effect

The drive circuit 100 includes the FET 111 (first switching element) inserted in the current path 101 connecting the actuator 130 (load) with the resonance frequency to the ground potential point (reference potential point), the operational amplifier 112 (drive element) having the first input terminal (−) to which a load signal obtained by converting a current flowing in the current path 101 into a voltage is input, the second input terminal (+) to which the reference signal (first control signal) that serves as a reference for operation of the FET 111 (first switching element) is input, and the output terminal connected to the control terminal of the FET 111 (first switching element), and the FET 113 (second switching element) inserted in the first connection path connecting the output terminal of the operational amplifier 112 (drive element) and the first input terminal (−) of the operational amplifier 112 (drive element). Accordingly, the gain of the operational amplifier 112 may be switched by switching the FET 113 on and off, and a braking force on the actuator 130 may be suppressed in the second half by setting the gain of the operational amplifier 112 to 1 in the second half of the cycle T.

Thus, the drive circuit 100 capable of efficiently driving a load may be provided.

The only FET that drives the actuator 130 is the single FET 111, which is connected to the low side of the actuator 130. Although drive circuits that connect four FETs of large size for current drive in an H-bridge configuration have been generally used, for example, in contrast to such drive circuits, the drive circuit 100 may have a simple configuration with fewer FETs for current drive.

The first resistor (R2) inserted in the path 102 (second connection path) connecting the output terminal of the operational amplifier 112 (drive element) to the control terminal of the FET 111 (first switching element) may be further included. A current value of an inrush current flowing from the output terminal of the operational amplifier 112 to the path 102 may be limited to reduce the load on the operational amplifier 112 and protect the operational amplifier 112.

The second resistor (R3) inserted in the path 104 (branch path) connecting the ground potential point (reference potential point) with the branch point that branches off from the path 102 (second connection path) between the first resistor (R2) and the control terminal of the FET 111 (first switching element) may be further included. Even when an output of the operational amplifier 112 becomes indeterminate, a voltage in the path 102 may be set to a voltage near the ground potential point, and accordingly, stable operation of the drive circuit 100 is enabled.

The actuator 130 (load) may be a linear resonant actuator, the FET 111 (first switching element) and the FET 113 (second switching element) may be field effect transistors, and the operational amplifier 112 (drive element) may be an operational amplifier. By using a linear resonant actuator, a field effect transistor, and an operational amplifier, the drive circuit 100 capable of efficiently driving the linear resonant actuator can be provided.

The controller 121 that controls the operational amplifier 112 (drive element) and the FET 113 (second switching element) may be further included. The controller 121 may output a reference signal (first control signal) to the operational amplifier 112 (drive element) that has a cycle corresponding to the resonance frequency of the actuator 130 (load) and that turns on and off within each cycle. The controller 121 may output a control signal (second control signal) to the FET 113 (second switching element) that has a cycle corresponding to the resonance frequency of the actuator 130 (load) and that turns on and off within each cycle. Furthermore, the controller 121 may perform control such that a start of the cycle of the reference signal (first control signal) and a start of the cycle of the control signal (second control signal) are matched and the reference signal (first control signal) is repeatedly turned on during an off period of the control signal (second control signal). Since the drive signal of the load may rise slowly, the load may be efficiently driven.

The controller 121 may be connected to the second input terminal (+) of the operational amplifier 112 (drive element) and the control terminal of the FET 113 (second switching element). The controller 121 may output the reference signal (first control signal) to the second input terminal and the control signal (second control signal) to the control terminal of the FET 113 (second switching element). The controller 121 drives the operational amplifier 112 and the FET 113 to provide the drive circuit 100 capable of driving the FET 111.

The control signal (second control signal) may be turned off in the first half of the cycle of the resonance frequency of the actuator 130 (load) and turned on in the remaining half of the cycle. The reference signal (first control signal) may then be repeatedly turned on within the first quarter of the cycle of the resonance frequency of the actuator 130 (load) and turned off in the remaining three-quarters of the cycle. The drive circuit 100 capable of generating a drive voltage that sinusoidally changes in the first half of the cycle T and that may drive the actuator 130 without applying a braking force to the actuator 130 in the second half and capable of more efficiently driving the load may be provided.

The reference signal (first control signal) may be repeatedly turned on while a duty ratio of the PWM pulse signal is increased within the first quarter period. The first period of T/4 of the cycle T ensures that the transducer of the actuator 130 is accelerated and good vibration is obtained.

The tactile sensation generator 100A includes the drive circuit 100 described above and the actuator 130 (load). Thus, the tactile sensation generator 100A capable of efficiently driving the load may be provided.

In a method for controlling a drive circuit, the drive circuit includes the FET 111 (first switching element) inserted in the current path 101 connecting the actuator 130 (load) with the resonance frequency to the ground potential point (reference potential point), the operational amplifier 112 (drive element) that performs drive control of the FET 111 (first switching element), the FET 113 (second switching element) inserted in the path 103 (first connection path) connecting the output terminal of the operational amplifier 112 (drive element) to the first input terminal (−) of the operational amplifier 112 (drive element), and the controller 121 that controls the operational amplifier 112 (drive element) and the FET 113 (second switching element). The controller 121 outputs the reference signal (first control signal) that has a cycle corresponding to the resonance frequency of the actuator 130 (load) and that is turned on and off within each cycle to the operational amplifier 112 (drive element), outputs the control signal (second control signal) that has a cycle corresponding to the resonance frequency of the actuator 130 (load) and that is turned on and off within each cycle to the FET 113 (second switching element), and performs control such that a start of the cycle of the reference signal (first control signal) and a start of the cycle of the control signal (second control signal) are matched and the reference signal (first control signal) is repeatedly turned on during an off period of the control signal (second control signal). Since the drive signal of the load may gradually rise, the method for controlling the drive circuit capable of efficiently driving the load may be provided.

The control signal (second control signal) may be turned off in the first half of the cycle of the resonance frequency of the actuator 130 (load) and turned on in the remaining half of the cycle. The reference signal (first control signal) may then be repeatedly turned on within the first quarter of the cycle of the resonance frequency of the actuator 130 (load) and turned off in the remaining three-quarters of the cycle. The drive circuit 100 capable of generating a drive voltage that sinusoidally changes in the first half of the cycle T and that may drive the actuator 130 without applying a braking force to the actuator 130 in the second half and capable of more efficiently driving the load may be provided.

The reference signal (first control signal) may be repeatedly turned on while a duty ratio of the PWM pulse signal is increased within the first quarter period. The first period of T/4 of the cycle T ensures that the transducer of the actuator 130 is accelerated and good vibration is obtained.

The above describes the drive circuit, the tactile sensation generator, and the method for controlling the drive circuit according to the exemplary embodiment of the present disclosure. However, the present disclosure is not limited to the specifically disclosed embodiment, and various modifications and changes may be made without departing from the scope of the claims.

With respect to the above embodiments, the following appendices are further disclosed.

Appendix 1

A drive circuit, comprising:
a first switching element inserted in the current path connecting the load with resonance frequency and the reference potential point;
a drive element having a first input terminal to which a load signal obtained by converting a current flowing in the current path into a voltage is input, a second input terminal to which a first control signal that serves as a reference for operation of the first switching element is input, and an output terminal connected to a control terminal of the first switching element; and
a second switching element inserted in a first connection path connecting the output terminal of the drive element and the first input terminal of the drive element.

Appendix 2

The drive circuit according to Appendix 1, further comprising a first resistor inserted in a second connection path connecting the output terminal of the drive element and the control terminal of the first switching element.

Appendix 3

The drive circuit according to Appendix 2, further comprising a second resistor inserted in a branch path connecting a reference potential point to a branch point that branches off from the second connection path between the first resistor and the control terminal of the first switching element.

Appendix 4

The drive circuit according to any one of Appendix 1 to Appendix 3, wherein the load is an inductive load having a resonance frequency, the first and second switching elements are field effect transistors, and the drive element is an operational amplifier.

Appendix 5

The drive circuit according to any one of Appendix 1 to Appendix 4, further comprising:
a controller that controls the drive element and the second switching element, wherein
the controller
outputs a first control signal that has a cycle corresponding to the resonance frequency of the load and that is turned on and off within each cycle to the drive element,
outputs a second control signal that has a cycle corresponding to the resonance frequency of the load and that is turned on and off within each cycle to the second switching element, and
performs control such that a start of the cycle of the first control signal and a start of the cycle of the second control signal are matched and the first control signal is repeatedly turned on during an off period of the second control signal.

Appendix 6

The drive circuit according to Appendix 5, wherein the controller is connected to a second input terminal of the drive element and a control terminal of the second switching element, and outputs the first control signal to the second input terminal and a second control signal to the control terminal of the second switching element.

Appendix 7

The drive circuit according to Appendix 5, wherein
the second control signal is turned off in a first half of the cycle of the resonance frequency of the load and turned on in a remaining half of the cycle, and
the first control signal is repeatedly turned on within a first quarter of the cycle of the resonance frequency of the load and is turned off in the remaining three-quarters of the cycle.

Appendix 8

The drive circuit according to Appendix 7, wherein the first control signal is repeatedly turned on with an increasing duty ratio of a pulse width modulation pulse signal within the first quarter of the cycle.

Appendix 9

A tactile sensation generator comprising:
the drive circuit according to any one of Appendix 1 to Appendix 8; and
the load.

Appendix 10

A method for controlling a drive circuit, wherein
the drive circuit includes a first switching element inserted in the current path connecting the load with resonance frequency and the reference potential point, a drive element that performs drive control of the first switching element, a second switching element inserted in a first connection path connecting an output terminal of the drive element to a first input terminal of the drive element, and a controller that controls the drive element and the second switching element, and the controller outputs a first control signal that has a cycle corresponding to the resonance frequency of the load and that is turned on and off within each cycle to the drive element, outputs a second control signal that has a cycle corresponding to the resonance frequency of the load and that is turned on and off within each cycle to the second switching element, and performs control such that a start of the cycle of the first control signal and a start of the cycle of the second control signal are matched and the first control signal is repeatedly turned on during an off period of the second control signal.

Appendix 11

The method for controlling a drive circuit according to Appendix 10, wherein the second control signal is turned off in a first half of the cycle of the resonance frequency of the load and turned on in a remaining half of the cycle, and the first control signal is repeatedly turned on within a first quarter of the cycle of the resonance frequency of the load and is turned off in the remaining three-quarters of the cycle.

Appendix 12

The method for controlling a drive circuit according to Appendix 11, wherein the first control signal is repeatedly turned on with an increasing duty ratio of a pulse width modulation pulse signal within the first quarter of the cycle.

What is claimed is:

1. A drive circuit comprising:

a first switching element inserted in a current path connecting a load with a resonance frequency to a reference potential point;

a drive element having a first input terminal to which a load signal obtained by converting a current flowing in the current path into a voltage is input, a second input terminal to which a first control signal that serves as a reference for operation of the first switching element is input, and an output terminal connected to a control terminal of the first switching element;

a second switching element inserted in a first connection path connecting the output terminal of the drive element and the first input terminal of the drive element;

a first resistor inserted in a second connection path connecting the output terminal of the drive element and the control terminal of the first switching element; and a second resistor inserted in a branch path connecting the reference potential point to a branch point that branches off from the second connection path between the first resistor and the control terminal of the first switching element.

2. The drive circuit according to claim 1, wherein the load is an inductive load having the resonance frequency, the first and second switching elements are field effect transistors, and the drive element is an operational amplifier.

3. The drive circuit according to claim 1, further comprising:

a controller configured to control the drive element and the second switching element, wherein the controller is further configured to:

output a first control signal that has a cycle corresponding to the resonance frequency of the load and that is turned on and off within each cycle to the drive element, element;

output a second control signal that has the cycle corresponding to the resonance frequency of the load and that is turned on and off within each cycle to the second switching element; and perform control such that a start of the cycle of the first control signal and a start of the cycle of the second control signal are matched and the first control signal is repeatedly turned on during an off period of the second control signal.

4. The drive circuit according to claim 3, wherein the controller is connected to the second input terminal of the drive element and a control terminal of the second switching element, and the controller is further configured to output the first control signal to the second input terminal and output the second control signal to the control terminal of the second switching element.

5. The drive circuit according to claim 3, wherein the second control signal is turned off in a first half of the cycle of the resonance frequency of the load and turned on in a remaining half of the cycle, and the first control signal is repeatedly turned on within a first quarter of the cycle of the resonance frequency of the load and is turned off in the remaining three-quarters of the cycle.

6. The drive circuit according to claim 5, wherein the first control signal is repeatedly turned on with an increasing duty ratio of a pulse width modulation pulse signal within the first quarter of the cycle.

7. A tactile sensation generator comprising:

the drive circuit according to claim 1, and the load.

8. A method for controlling a drive circuit, wherein the drive circuit includes:

a first switching element inserted in a current path connecting a load with a resonance frequency to a reference potential point;

a drive element that performs drive control of the first switching element;

a second switching element inserted in a first connection path connecting an output terminal of the drive element to a first input terminal of the drive element; and a controller configured to control the drive element and the second switching element, and the method for controlling the drive circuit by causing the controller to execute a process, the method comprising executing on the controller the steps of:

outputting a first control signal that has a cycle corresponding to the resonance frequency of the load and that is turned on and off within each cycle to the drive element;

outputting a second control signal that has the cycle corresponding to the resonance frequency of the load and that is turned on and off within each cycle to the second switching element; and performing control such that a start of the cycle of the first control signal and a start of the cycle of the second control signal are matched and the first control signal is repeatedly turned on during an off period of the second control signal.

9. The method for controlling a drive circuit according to claim 8, wherein the second control signal is turned off in a first half of the cycle of the resonance frequency of the load and turned on in a remaining half of the cycle, and the first control signal is repeatedly turned on within a first quarter of the cycle of the resonance frequency of the load and is turned off in the remaining three-quarters of the cycle.

10. The method for controlling a drive circuit according to claim 9, wherein the first control signal is repeatedly turned on with an increasing duty ratio of a pulse width modulation pulse signal within the first quarter of the cycle.

11. A drive circuit comprising:

a first switching element inserted in a current path connecting a load with a resonance frequency to a reference potential point;

a drive element having a first input terminal to which a load signal obtained by converting a current flowing in the current path into a voltage is input, a second input terminal to which a first control signal that serves as a reference for operation of the first switching element is input, and an output terminal connected to a control terminal of the first switching element;

a second switching element inserted in a first connection path connecting the output terminal of the drive element and the first input terminal of the drive element; and a controller configured to control the drive element and the second switching element, wherein the controller is further configured to:

output a first control signal that has a cycle corresponding to the resonance frequency of the load and that is turned on and off within each cycle to the drive element;

output a second control signal that has the cycle corresponding to the resonance frequency of the load and that is turned on and off within each cycle to the second switching element; and perform control such that a start of the cycle of the first control signal and a start of the cycle of the second control signal are matched and the first control signal is repeatedly turned on during an off period of the second control signal.

12. The drive circuit according to claim 11, further comprising:

a first resistor inserted in a second connection path connecting the output terminal of the drive element and the control terminal of the first switching element.

13. The drive circuit according to claim 12, further comprising:

a second resistor inserted in a branch path connecting the reference potential point to a branch point that branches off from the second connection path between the first resistor and the control terminal of the first switching element.

14. The drive circuit according to claim 11, wherein the load is an inductive load having the resonance frequency, the first and second switching elements are field effect transistors, and the drive element is an operational amplifier.

15. The drive circuit according to claim 11, wherein the controller is connected to the second input terminal of the drive element and a control terminal of the second switching element, and the controller is further configured to output the first control signal to the second input terminal and output the second control signal to the control terminal of the second switching element.

16. The drive circuit according to claim 11, wherein the second control signal is turned off in a first half of the cycle of the resonance frequency of the load and turned on in a remaining half of the cycle, and the first control signal is repeatedly turned on within a first quarter of the cycle of the resonance frequency of the load and is turned off in the remaining three-quarters of the cycle.

17. The drive circuit according to claim 16, wherein the first control signal is repeatedly turned on with an increasing duty ratio of a pulse width modulation pulse signal within the first quarter of the cycle.

18. A tactile sensation generator comprising:

the drive circuit according to claim 11, and the load.

* * * * *